US008884906B2

(12) United States Patent
Vembu et al.

(10) Patent No.: US 8,884,906 B2
(45) Date of Patent: *Nov. 11, 2014

(54) OFFLOADING TOUCH PROCESSING TO A GRAPHICS PROCESSOR

(71) Applicant: Intel Corporation, Santa Clara, CA (US)

(72) Inventors: Balaji Vembu, Folsom, CA (US); David I. Poisner, Carmichael, CA (US); Arvind Kumar, Beaverton, OR (US); Chaitanya R. Gandra, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/724,291

(22) Filed: Dec. 21, 2012

(65) Prior Publication Data

US 2014/0176572 A1    Jun. 26, 2014

(51) Int. Cl.
*G06T 1/20*    (2006.01)

(52) U.S. Cl.
CPC ...................... *G06T 1/20* (2013.01)
USPC ........................................ 345/173

(58) Field of Classification Search
USPC ........................................ 345/502
See application file for complete search history.

(56) References Cited

U.S. PATENT DOCUMENTS

| | | | |
|---|---|---|---|
| 6,144,391 A * | 11/2000 | Hinson et al. ................. | 345/540 |
| 8,166,207 B2 | 4/2012 | White | |
| 8,542,206 B2 * | 9/2013 | Westerman et al. .......... | 345/173 |
| 2010/0097342 A1 | 4/2010 | Simmons et al. | |
| 2011/0050710 A1 * | 3/2011 | Sadowski et al. ............. | 345/502 |
| 2011/0221706 A1 * | 9/2011 | McGibney et al. ........... | 345/175 |
| 2011/0296333 A1 | 12/2011 | Bateman et al. | |
| 2012/0092277 A1 | 4/2012 | Momchilov | |
| 2012/0300123 A1 | 11/2012 | Lares | |
| 2013/0091449 A1 * | 4/2013 | Tu et al. ......................... | 715/765 |
| 2013/0111138 A1 * | 5/2013 | Suzuki et al. ................. | 711/122 |
| 2013/0238912 A1 * | 9/2013 | Priel et al. ..................... | 713/300 |
| 2014/0049480 A1 * | 2/2014 | Rabii ............................. | 345/173 |

OTHER PUBLICATIONS

Ng, Albert, et al. "Designing for Low-Latency Direct-Touch Input." Proceedings of the 25th annual ACM symposium on User interface software and technology (ACM Oct. 7-10, 2012).*
Wikipedia: Interrupt as appearing on Dec. 8, 2102, at http://en.wikipedia.org/w/index.php?title=Interrupt&oldid=52696116.*
University of Illinois at Chicago, Course Notes, Operating Systems, Chapter 4: Threds as appearing in Jun. 2012 at http://www.cs.uic.edu/~jbell/CourseNotes/OperatingSystems/4_Threads.html.*

(Continued)

*Primary Examiner* — David Zarka
*Assistant Examiner* — Richard M Russell
(74) *Attorney, Agent, or Firm* — Trop, Pruner & Hu, P.C.

(57) ABSTRACT

In an embodiment, a processor includes a graphics domain including a graphics engines each having at least one execution unit. The graphics domain is to schedule a touch application offloaded from a core domain to at least one of the plurality of graphics engines. The touch application is to execute responsive to an update to a doorbell location in a system memory coupled to the processor, where the doorbell location is written responsive to a user input to the touch input device. Other embodiments are described and claimed.

20 Claims, 7 Drawing Sheets

(56) References Cited

OTHER PUBLICATIONS

NVIDIA Tegra Mobile Processors at http://web.archive.org/web/20121213032856/http://www.nvidia.com/object/tegra-3-processor.html.*

U.S. Appl. No. 13/552,122, filed Jul. 18, 2012, entitled "Peforming Scheduling Operations for Graphics Hardware," by Balaji Vembu.

International Searching Authority, "Notification of Transmittal of the International Search Report and the Written Opinion of the International Searching Authority," mailed Nov. 6, 2013, in International application No. PCT/US2013/048795.

NVIDIA DirectTouchTM Architecture, Jan. 23, 2012, Retrieved from http://www.nvidia.com/content/PDF/tegra_white_papers/direct-touch-whitepaper.pdf See pp. 3-5.

* cited by examiner

OFFLOADING TOUCH PROCESSING TO A GRAPHICS PROCESSOR

BACKGROUND

As more users adopt smartphones, tablet computers and other touch screen enabled devices, the importance of user interaction with a computing device via a touchpad, touch screen or other human input device (HID) increases. Commonly, a touch input device for smartphone, tablet or other device is implemented via an array of sensors to which analog circuitry is coupled to determine a user touch and provide this information to a touch controller, which typically is implemented using digital circuitry in a separate integrated circuit. In general, this touch controller operates to receive inputs from one or more analog circuits that connect to the touch array and determine touch locations, filter false touches, and provide an HID packet for output to other circuitry of the computing device such as a host processor.

Touch processing typically involves analyzing a capacitance or equivalent data from a touch sensor array and then identifying data points that resemble a fingertip, palm, etc. Once a cluster of such data points is identified, additional processing is performed to compute the characteristics of the touch such as location coordinates, width/height of the digit, pressure and so forth. While an embedded touch controller typically performs these computations, as compute complexity increases with advances in touch input devices, the relatively basic signal processing afforded by such a controller may be insufficient.

DETAILED DESCRIPTION

In various embodiments, touch processing for an associated touch input device may be implemented in a general-purpose processor of a computer system such as smartphone, tablet computer, laptop, Ultrabook™ or other such device. As will be described further, in particular embodiments the touch processing may be implemented within one or more graphics engines of a graphics domain of a multi-domain processor. As such, the massive parallel compute capabilities inherent in such graphics processors can be used to accelerate touch processing. Furthermore, the need for the complexity, real estate consumption and additional expense of discrete logic circuits outside of the general purpose processor to handle touch processing can be avoided.

Figure 1:
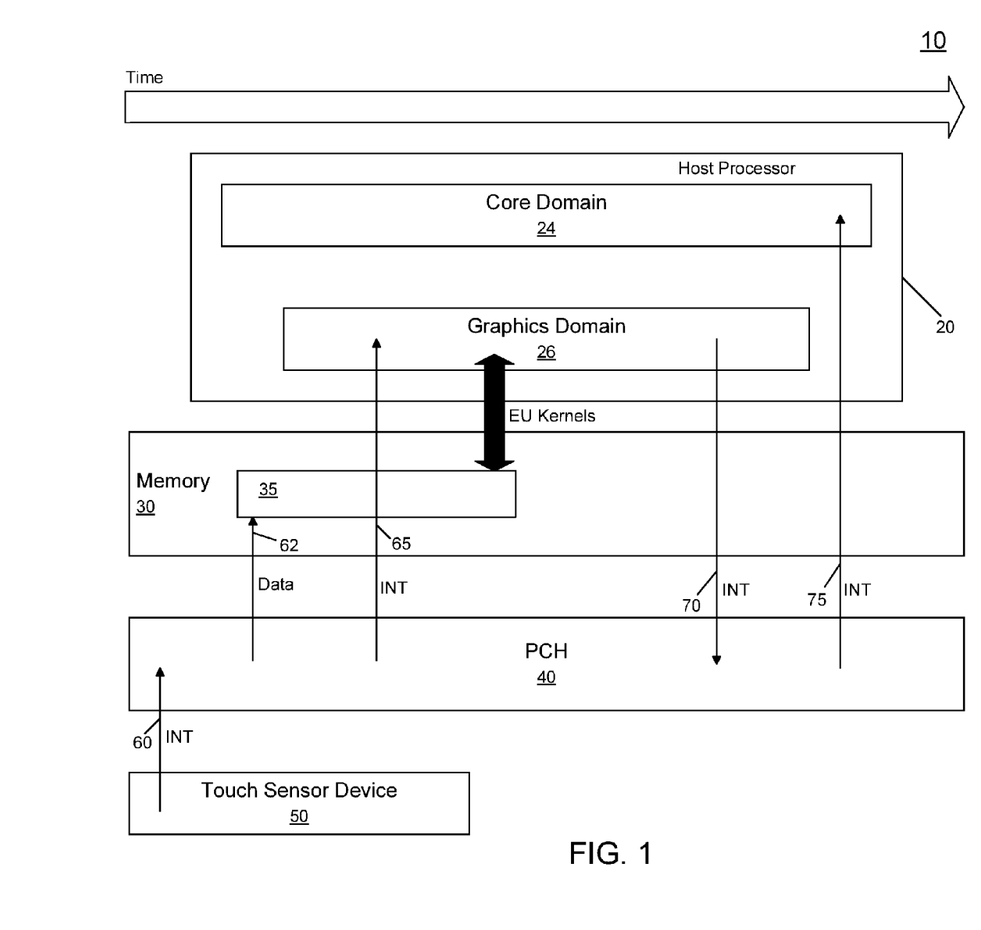
FIG. 1 is a block diagram of the overall components involved in performing touch processing in an architecture in accordance with an embodiment of the present invention.

Referring now to FIG. 1, shown is a block diagram of the overall components involved in performing touch processing in an architecture in accordance with an embodiment of the present invention. As further detailed in FIG. 1, a flow of communications to handle a touch event is also described.

System 10, which may be any type of computing device incorporating a touch input device, includes a host processor 20 which in an embodiment may be a multi-domain processor including a core domain 24 including one or more processor cores and a graphics domain 26 including one or more graphics engines. In turn, this processor is coupled to a system memory 30 which in an embodiment may be a dynamic random access memory (DRAM). As will be discussed, a memory region 35 may be allocated for storing and performing the touch processing described herein. In turn, memory 30 may further couple to a peripheral controller hub (PCH) 40 that provides an interface between host processor 20 and various peripheral devices including a touch sensor device 50.

In this logical flow of communications for touch processing system memory 30 is shown interposed between host processor 20 and PCH 40. However understand that in many implementations, memory 30 may be directly coupled to host processor 20, and more specifically to a memory controller integrated within the host processor. And in turn, PCH 40 may directly couple to host processor 20, e.g., by way of so-called system agent circuitry of the host processor, which includes various interface circuitry to enable communication between the host processor and PCH 40.

As further illustrated in FIG. 1, a touch processing sequence begins by receipt of a first interrupt 60 in PCH 40 from touch sensor device 50 indicating the availability of raw touch data. Note that this touch sensor device may be implemented solely with analog circuitry such that minimal digital processing of the raw touch data is performed in touch sensor 50 (although a basic digital controller may be present to control sample rates and other features of the touch device). For example, different sample rates may be used by the touch input device depending on whether the input device is a user's finger or a stylus. This determination may be made by the touch application responsive to analysis of initial user input that indicates whether the input is touch-like (e.g., having a relatively large number of data touch points) or a stylus (having a relatively small number of data touch points).

Responsive to receipt of this interrupt in PCH 40, raw touch data 62 may be written into memory region 35 of memory 30. And in turn, an interrupt 65 may be communicated from PCH 40 to host processor block 20, and more specifically in the embodiment shown to graphics domain 26. Then, a touch application executing within graphics domain 26 by way of code stored in memory region 35, also referred to herein as so-called execution unit (EU) kernel code, may access the data. This touch application may process the raw touch data to perform various signal processing resulting in processed touch data, which may include identification of coordinate information, a touch sequence, a swipe or other gesture, signature recognition or so forth.

When graphics domain 26 has completed the touch processing on the raw data, an interrupt 70 may be communicated to PCH 40 to allow the PCH to return any touch characteristics to touch sensor device 50 (e.g., to indicate that the touch point resembled a finger or stylus). The completion of the touch processing by graphics domain 26 also causes generation of yet another interrupt 75, directed to core domain 24 on which an OS or other software that is to receive the processed touch data is operating. Although shown at this high level in the embodiment of FIG. 1 and with the particular flow of operations and communications, understand the scope of the present invention is not limited in this regard. For example, in another embodiment instead of issuing an interrupt from graphics domain 26 to PCH 40 (namely interrupt 70) an interrupt to inform core domain 24 of the availability of processed touch data may directly issue from graphics domain 26 to core domain 24.

Various implementations of touch applications are possible. For example, touch algorithms can be implemented in an appropriate high level language such as object constraint language (OCL), C for media or so forth. This application may be embedded in a host application that is offloaded from the host domain to the graphics domain. In turn, one or more graphics execution units of one or more graphics engines of the graphics domain can execute the touch application. The nature of processing performed on the graphics domain can range from simply determining touch points and characteristics (width, height) to more complex functions like recognizing gestures (swipes, signatures, handwriting recognition, etc.). To allow the touch processing to be performed in a responsive manner, execution of the touch application may be responsive to a graphics scheduler, which may provide a relatively high priority for scheduling execution of this touch processing workload within the graphics domain. In an embodiment, the graphics scheduler can receive notification of a new workload via a memory location-based doorbell mechanism, as will be described further.

In an embodiment, several doorbell mechanisms may be provided for inter-device notification. First, a touch IO interface (which may be included within a sensor interface) may communicate via a first doorbell to indicate to the graphics engine that raw touch data is ready for processing. The first doorbell has the ability to invoke the graphics engine for touch processing without waking up the core domain to minimize power. In turn, a second doorbell may indicate to the touch IO interface that processed touch data is ready and to request interrupt processing to a host.

Upon initialization of a system including a touch architecture as described herein, after the system is booted, the touch application is launched which in turn sets up a graphics context to be executed whenever touch processing is needed. In general, the touch application provides to one or more graphics processors EU kernels that execute within EUs of the graphics processors when the touch graphics context is scheduled for execution. As mentioned above, the touch application requests a graphics doorbell (namely a memory location in main memory) and a touch IO interface doorbell (which in an embodiment may be a memory mapped IO (MMIO) register location or a memory-based doorbell). In addition, the touch application requests an allocation of shared buffer space within the system memory. This shared buffer space may include an input buffer for raw touch data and an output buffer for processed touch characteristics. In turn, this doorbell information and the shared buffer location may be communicated to both endpoints, namely the graphics domain and a touch IO interface. The graphics commands that invoke the EU kernels to process data use the shared buffer as input and write the final computed result into the output buffer. In an embodiment this touch IO interface can be implemented in an integrated sensor hub (ISH) that may be within a peripheral controller, a standalone ISH device or another system location. At this point the touch application is set up and ready for execution on an indication of incoming raw touch data.

Then during runtime operation, the touch IO interface receives an interrupt from the touch sensor device to indicate that raw data is available. In turn, this touch IO interface enables transfer of the raw data into the shared input buffer and writes an indication of the presence of this data to the graphics doorbell. In turn, a graphics scheduler may schedule this touch graphics context at the next available opportunity. In an embodiment, this scheduling may be treated as high priority. In turn, one or more EUs of one or more graphics engines may execute graphics kernels to operate on the raw data and write the touch characteristics into the shared output buffer. In turn, the graphics domain sends a doorbell notification to the touch IO interface to indicate that this data is ready for communication to the host. In turn, the touch IO interface issues an interrupt to the host OS that enables the host OS to obtain and process the data as desired.

Furthermore, by offloading touch processing to one or more graphics processors as described herein, reduced power consumption can be realized, in that the parallel compute capacity of the graphics domain may be at a lower power consumption level than performing touch processing either in a core domain or in a standalone touch controller (which as described herein can be entirely avoided in various embodiments). The processing of the raw data to convert touch samples to touch points is highly parallelizable by breaking the touch sample array into regions on which multiple threads of computation can be launched in parallel. For example, raw data can be divided into regions that can be provided in parallel to determine touch points.

Note that the offloading of the touch application from host processor to the graphics domain can be a one-time operation (per reset event of the system). That is, once the touch application is offloaded to the graphics domain, the host processor does not need to perform any interaction on a given execution of the touch application responsive to user input. Instead, the only interaction that occurs is after touch processing is completed, an interrupt or other indication to the core domain may be made to enable an OS or other software executing on the core domain to access and use the processed touch data.

Figure 2:
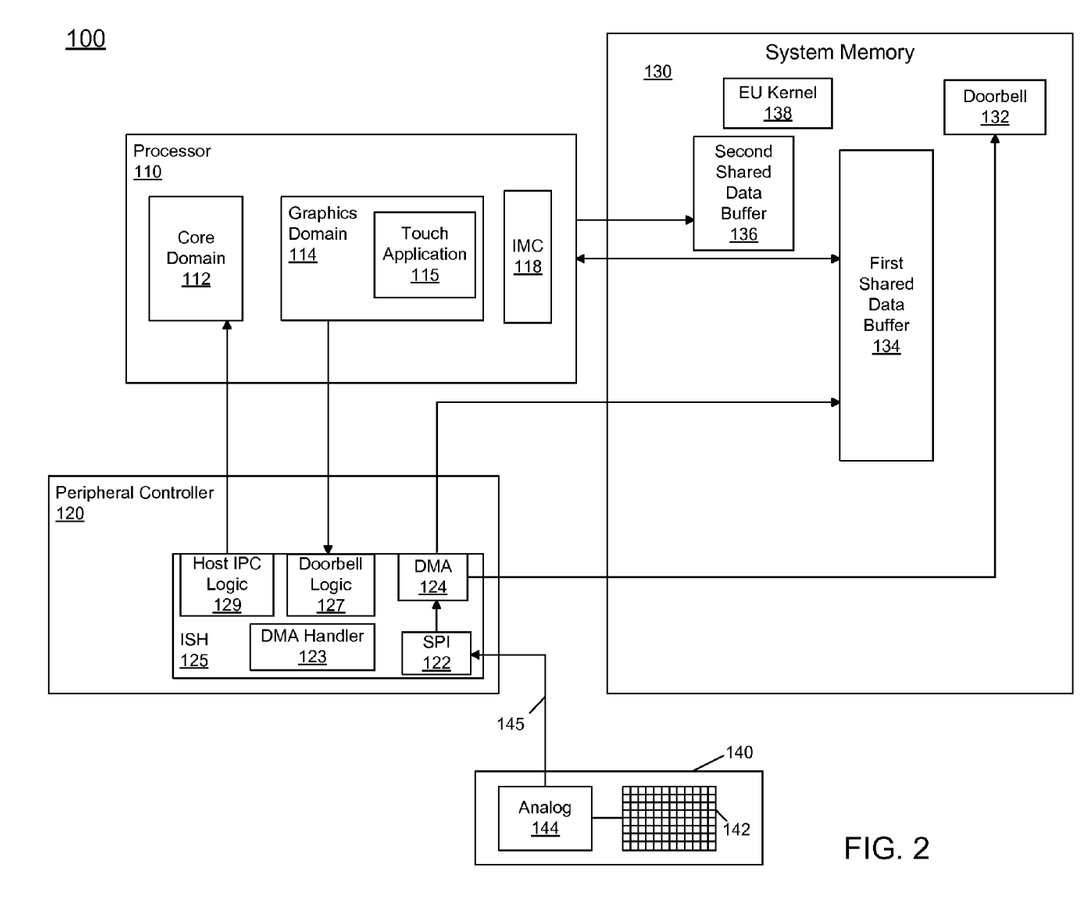
FIG. 2 is a more detailed block diagram of a system in accordance with an embodiment of the present invention.

Referring now to FIG. 2, shown is a more detailed block diagram of a system in accordance with an embodiment of the present invention. As shown in FIG. 2, system 100 includes a processor 110 that is coupled both to a system memory 130 and a peripheral controller 120. In turn, peripheral controller 120 is in communication with a touch input device 140 via an interconnect 145. In an embodiment, touch input device 140 may be coupled to peripheral controller 120 via a serial peripheral interface (SPI), an embedded display port (eDP) or another interconnect. By way of the architecture in FIG. 2, the need for a dedicated touch controller such as a separate integrated circuit within the system can be avoided and instead, analog circuitry 144 coupled to a touch array 142 of touch input device 140 is configured to directly provide raw sensed touch data to a integrated sensor hub (ISH) 125 within peripheral controller 120. Although described herein as using a capacitance touch array to obtain touch input, understand that other touch input devices using a different technology such as via light emitting cameras or other image based touch or gesture capture can be used. Of course, other types of touch input technologies may also be used. Also, while embodiments described herein utilize an ISH for receiving touch data from a touch sensor device, other arrangements are possible. For example, other controllers such as microcontrollers in the peripheral controller or elsewhere could be used, such as a manageability engine (ME) or converged security engine (CSE). Such controllers execute firmware and have direct control over the SPI interface and DMA operations. It is also possible to include a dedicated microcontroller to manage SPI ports and the associated direct memory access or a dedicated state machine may be provided to control the SPI interface and DMA operations (without use of a microcontroller).

As seen in FIG. 2, processor 110 includes a core domain 112 which can include a plurality of processor cores and a graphics domain 114 which may include multiple graphics engines such as a plurality of graphics processing units (GPUs) each including one or more execution units (EUs). On this hardware a touch application 115 may be executed. As also seen in FIG. 2, an integrated memory controller 118 may act as an interface between the hardware of processor 110 and system memory 130.

As to system memory 130, it is configured to communicate directly with peripheral controller 120 as well as with processor 110. As seen, system memory 130 includes a first shared data buffer 134 to receive raw data from touch input device 140 and a second shared data buffer 136 to store the processed touch data received from graphics domain 114. In addition, a doorbell location 132 may be written when raw touch data is stored into shared data buffer 134. Note that further present in system memory is a EU kernel 138, which may be a touch application workload to execute on one or more graphics processors within graphics domain 114.

In an embodiment, at least one graphics processor may be dedicated for touch processing, at least for certain portions of a runtime of a computing device. To that end, when no active touch inputs are being received, this dedicated graphics processor may be placed into a low power state and a monitor mechanism may be set up, e.g., via memory controller 118 to monitor doorbell location 132 such that upon an update to this location indicating presence of new raw touch data, the corresponding dedicated graphics processor may be powered up to perform the touch application processing for this new raw data. Similar monitoring can be used to determine presence of the raw touch data, which may cause EUs to pre-empt a currently running workload on the graphics engines and run the touch algorithm and then resume the original workload.

With reference to peripheral controller 120, ISH 125 includes a SPI interface 122 to receive raw data from touch device 140 and provide it via a direct memory access (DMA) engine 124 to system memory 130. Note that communication with touch input device 140 may be bidirectional, in that certain command information can be sent to the touch input device. For example, depending on whether a touch application determines a user is inputting a selection or providing a signature, different sampling rates of the touch input device may be controlled. In an embodiment, DMA engine 124 may execute according to a DMA handler 123. DMA engine 124 may be used to transfer raw touch data received via SPI interface 122 into first shared data buffer 134 within main memory 130. More specifically, this raw data stored in first data buffer 134 may be raw touch data written into a graphics input surface within the data buffer. When a graphics engine has completed touch processing on a given amount of raw touch data, an interrupt may be communicated to doorbell logic 127 of the ISH that in turn causes a host inter-processor communication (IPC) logic 129 to issue an interrupt to core domain 112 to indicate to the host OS the presence of processed touch data in shared data buffer 136. In another embodiment, the data received via SPI interface 122 may be stored into an internal memory such as a static random access memory (SRAM) and then separately communicated via a DMA operation to the system memory.

Although shown at this high level in the embodiment of FIG. 2, understand that various alternatives are possible. For example, while processor 110 and peripheral controller 120 are shown as separate integrated circuits formed in different packages, understand that in other implementations a single package including both processor 110 and peripheral controller 120 instead may be provided. And further understand that touch data may be received in a processor via another interface, such as a graphics interface or via a peripheral component interconnect such as a PCIe™ interface or a PCIe™ interface adapted for mobile communication, e.g., via a MIPI M-PHY physical unit, or another bus that supports bus mastering. Although shown at this high level in the embodiment of FIG. 2, understand the scope of the present invention is not limited in this regard.

Figure 3:
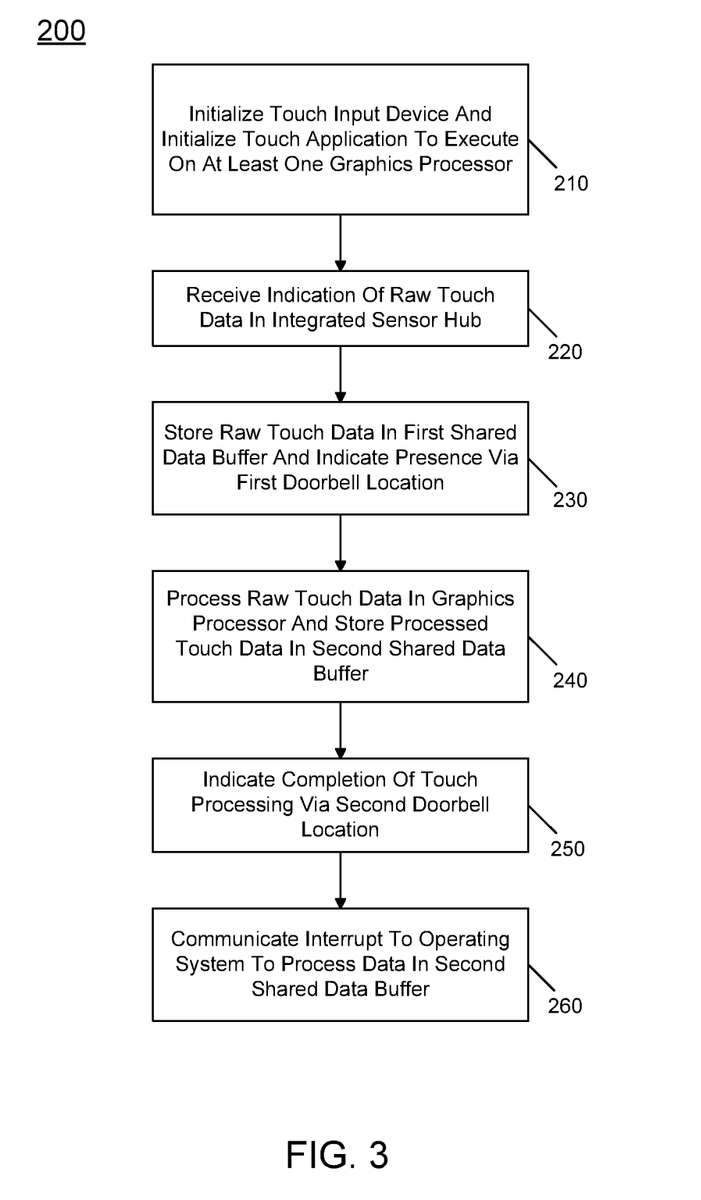
FIG. 3 is a flow diagram of a method for processing touch data in accordance with an embodiment of the present invention.

Referring now to FIG. 3, shown is a flow diagram of a method for processing touch data in accordance with an embodiment of the present invention. As shown in FIG. 3, method 200 may be performed by various components of a system, including graphics processors, an integrated sensor hub, and a touch input device. As seen, method 200 begins by initializing a touch input device and the touch application to execute on at least one graphics processor (block 210). Next, during runtime an indication of raw touch data may be received in the integrated sensor hub (block 220). Responsive to this indication, the raw touch data may be stored in a shared data buffer and the presence of this information may be indicated via a write to a first doorbell location, which in an embodiment may be a graphics doorbell stored in system memory (block 230). Next, the raw touch data may be processed in the at least one graphics processor, and processed touch data can be stored in a second shared data buffer (block 240). Next, completion of touch processing can be indicated via a write to a second doorbell location, which in an embodiment may be a ISH doorbell present within the integrated sensor hub (block 250). Finally, an interrupt can be communicated to the OS to enable further processing of this data stored in the second shared data buffer (block 260). Although shown at this high level in FIG. 3, understand the scope of the present invention is not limited in this regard.

Figure 4:
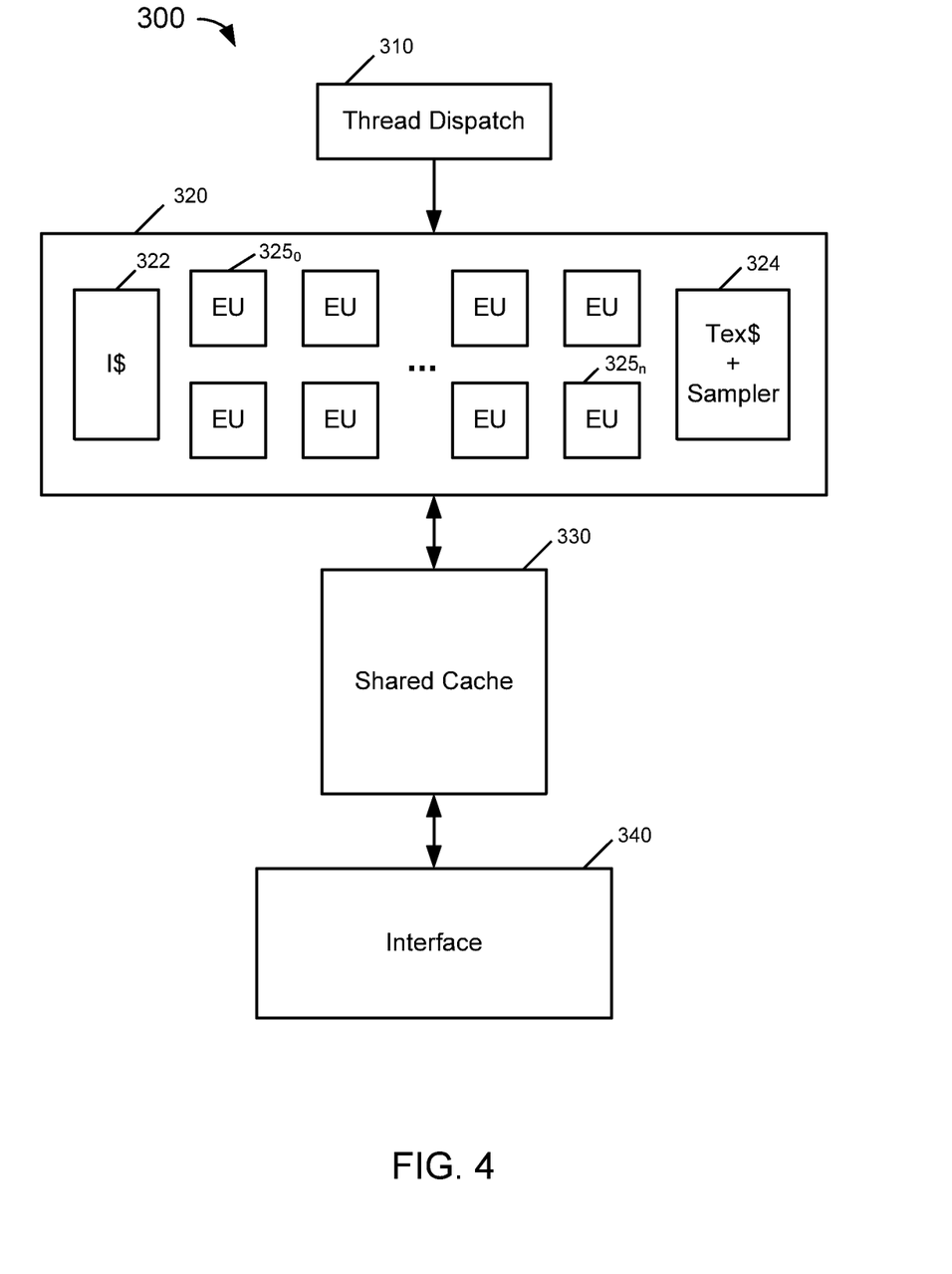
FIG. 4 is a block diagram of a graphics domain of a processor in accordance with an embodiment of the present invention.

Referring now to FIG. 4, shown is a block diagram of a graphics domain of a processor in accordance with an embodiment of the present invention. As shown in FIG. 4, domain 300 includes a thread dispatch unit 310 that receives incoming threads and dispatches them to a compute cluster 320 that includes a plurality of individual execution units $325_0$-$325_n$. Although the scope of the present invention is not limited in this regard in some embodiments between 4 and 16 EUs may be present. One or more of EUs 325 may be controlled to execute a touch application (or at least one or more touch processing algorithms of the application) as scheduled by a scheduler executing on thread dispatch unit 310. As further seen, these EUs may share an instruction cache 322 and a texture cache and sampler 324. In turn, compute cluster 320 couples to a shared cache memory 330 which in an embodiment may be a level 3 cache that in turn couples through an interface 340 to other components of a processor such as a ring interconnect that couples the graphics domain with a core domain and a system agent. In addition, the ring interconnect further couples the graphics domain to a larger shared cache structure such as a last level cache that in turn couples to further portions of a memory hierarchy such as a system memory.

Figure 5:
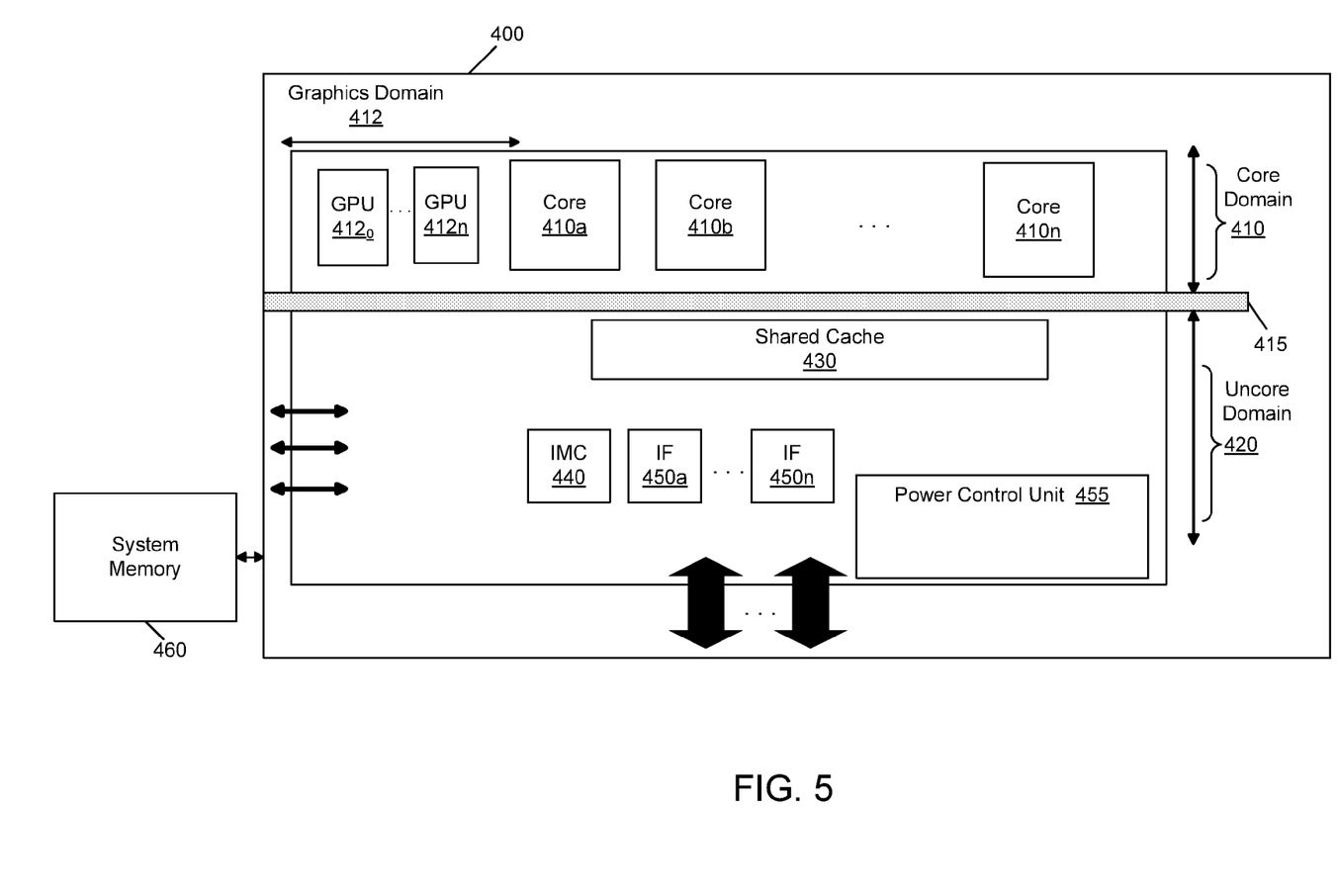
FIG. 5 is a block diagram of a processor in accordance with an embodiment of the present invention.

Referring now to FIG. 5, shown is a block diagram of a processor in accordance with an embodiment of the present invention. As shown in FIG. 5, processor 400 may be a multicore processor including a plurality of cores $410_a$-$410_n$ in a core domain 410. In one embodiment, each such core may be of an independent power domain and can be configured to operate at an independent voltage and/or frequency. As further shown in FIG. 5, one or more GPUs $412_0$-$412_n$ may be present in a graphics domain 412. Each of these independent graphics engines also may be configured to operate at independent voltage and/or frequency or may be controlled together as a single domain. One or more of GPUs 412 of the graphics domain may be configured to execute a touch application as described herein, offloaded by an OS or other entity executing within core domain 410.

These various compute elements may be coupled via an interconnect 415 to a system agent or uncore 420 that includes various components. As seen, the uncore 420 may include a shared cache 430 which may be a last level cache. In addition, the uncore may include an integrated memory controller 440, various interfaces 450 and a power control unit 455 to control power consumption by the components of the processor.

With further reference to FIG. 5, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 5, the scope of the present invention is not limited in this regard.

Note that processor 400 may be an out-of-order machine such as of a so-called x86 instruction set architecture (ISA) architecture, an in-order processor, a reduced instruction set computing (RISC) processor such as an ARM-based processor, or a processor of another type of ISA that can emulate instructions and operations of a different ISA via an emulation engine and associated logic circuitry.

That is, in other embodiments, a processor architecture may include emulation features such that the processor can execute instructions of a first ISA, referred to as a source ISA, where the architecture is according to a second ISA, referred to as a target ISA. In general, software, including both the OS and application programs, is compiled to the source ISA, and hardware implements the target ISA designed specifically for a given hardware implementation with special performance and/or energy efficiency features.

Figure 6:
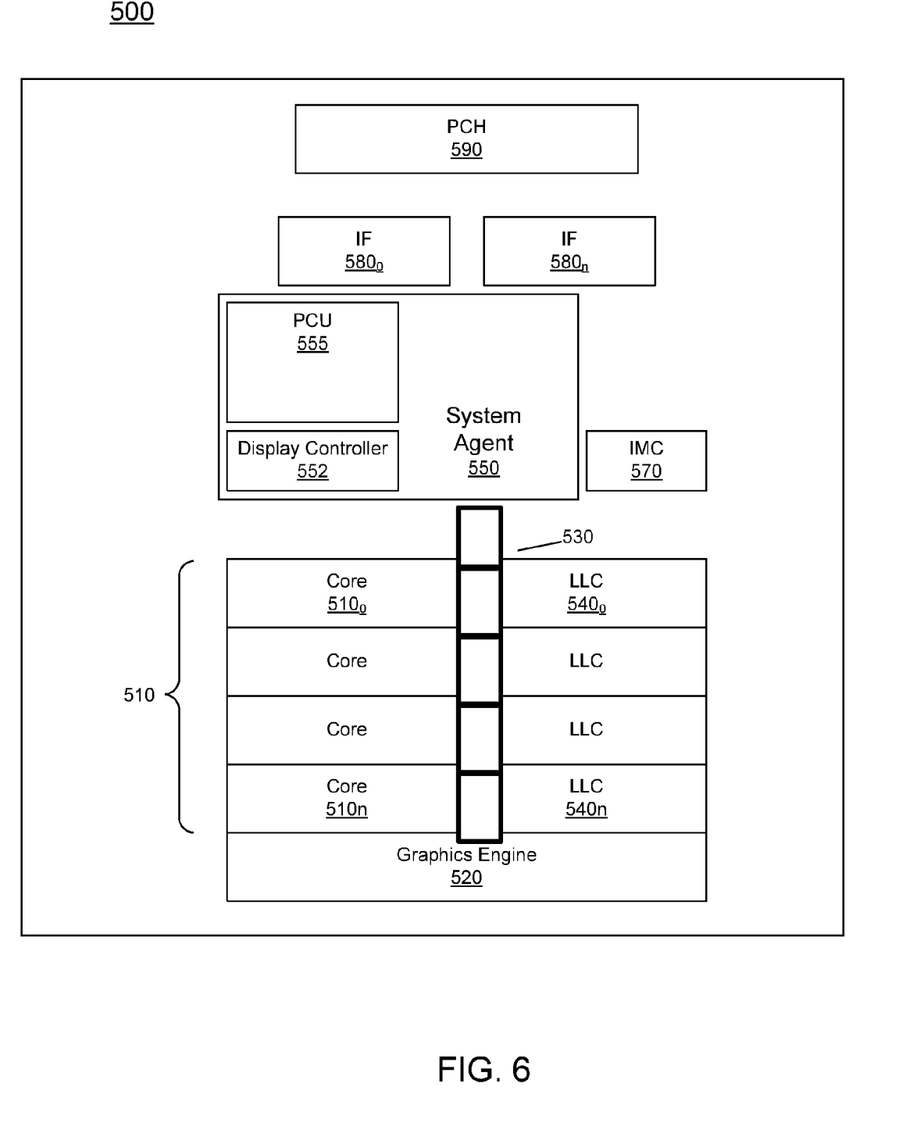
FIG. 6 is a block diagram of a multi-domain processor in accordance with another embodiment of the present invention.

Referring now to FIG. 6, shown is a block diagram of a multi-domain processor in accordance with another embodiment of the present invention. As shown in the embodiment of FIG. 6, processor 500 includes multiple domains. Specifically, a core domain 510 can include a plurality of cores $510_0$-$510_n$, a graphics domain 520 can include one or more graphics engines to execute an offloaded touch application, and a system agent domain 550 may further be present. In various embodiments, system agent domain 550 may remain powered on at all times to handle power control events and power management such that domains 510 and 520 can be controlled to dynamically enter into and exit low power states.

Note that while only shown with three domains, understand the scope of the present invention is not limited in this regard and additional domains can be present in other embodiments. For example, multiple core domains may be present each including at least one core. In this way, finer grained control of the amount of processor cores that can be executing at a given frequency can be realized.

In general, each core 510 may further include low level caches in addition to various execution units and additional processing elements. In turn, the various cores may be coupled to each other and to a shared cache memory formed of a plurality of units of a last level cache (LLC) $540_0$-$540_n$. In various embodiments, LLC 540 may be shared amongst the cores and the graphics engine, as well as various media processing circuitry. As seen, a ring interconnect 530 thus couples the cores together, and provides interconnection between the cores, graphics domain 520 and system agent circuitry 550.

In the embodiment of FIG. 6, system agent domain 550 may include display controller 552 which may provide control of and an interface to an associated display. As further seen, system agent domain 550 may include a power control unit 555.

As further seen in FIG. 6, processor 500 can further include an integrated memory controller (IMC) 570 that can provide for an interface to a system memory, such as a dynamic random access memory (DRAM). Multiple interfaces $580_0$-$580_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with a Intel® Quick Path Interconnect (QPI) protocol may also be provided. As further seen, a PCH 590 may also be present within the processor, and can be implemented in a processor package with the remainder of the processor on the same semiconductor die or a separate semiconductor die. This peripheral controller may include an integrated sensor hub to enable communication with various system sensors including a touch input device integrated into a system without a separate touch controller. Although shown at this high level in the embodiment of FIG. 6, understand the scope of the present invention is not limited in this regard.

Figure 7:
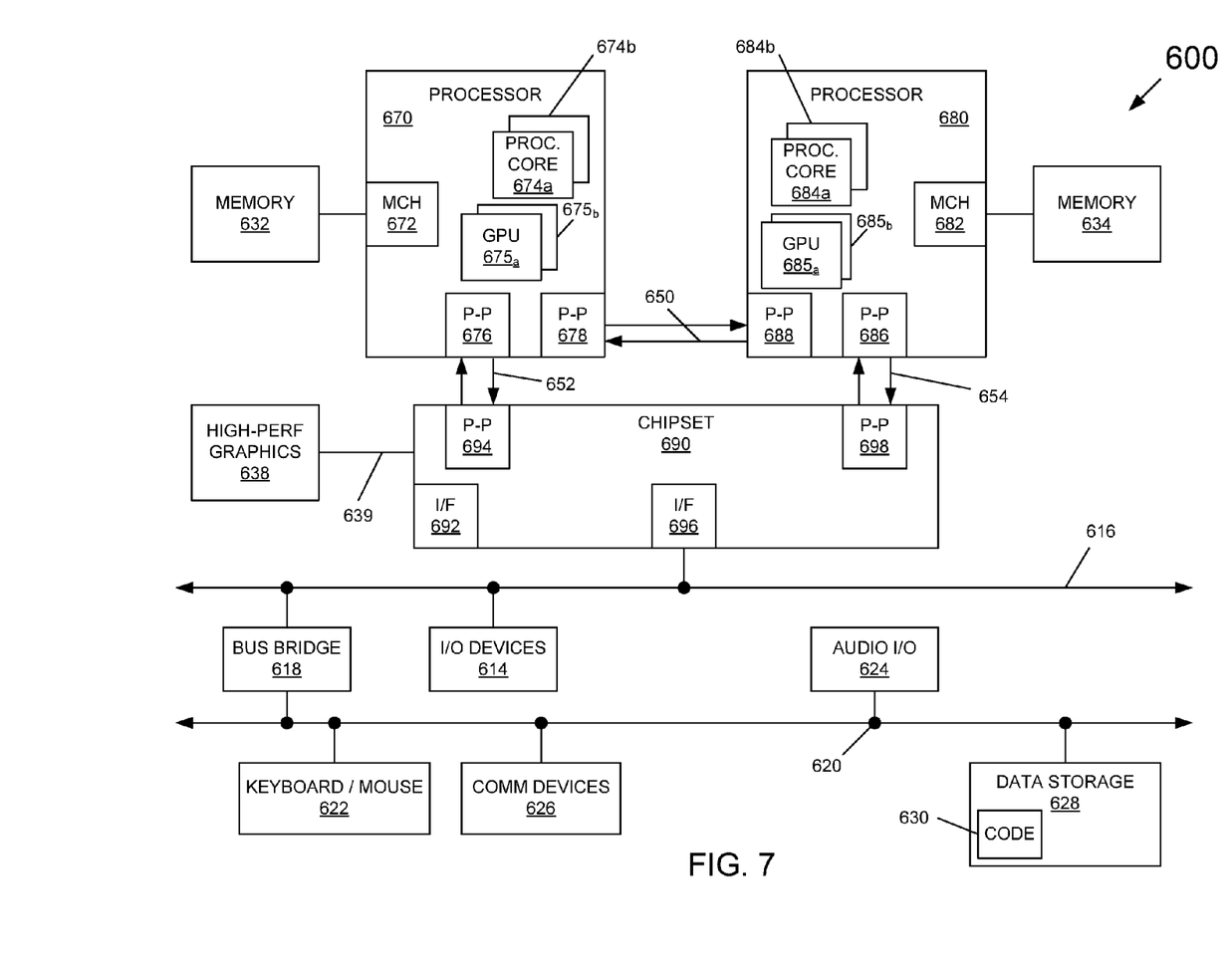
FIG. 7 is a block diagram of a system in accordance with an embodiment of the present invention.

Embodiments may be implemented in many different system types. Referring now to FIG. 7, shown is a block diagram of a system in accordance with an embodiment of the present invention. As shown in FIG. 7, multiprocessor system 600 is a point-to-point interconnect system, and includes a first processor 670 and a second processor 680 coupled via a point-to-point interconnect 650. As shown in FIG. 7, each of processors 670 and 680 may be multicore processors, including first and second processor cores (i.e., processor cores 674*a* and 674*b* and processor cores 684*a* and 684*b*), although potentially many more cores may be present in the processors. Each of the processors can include a graphics domain including a plurality of GPUs (e.g., GPUs 675*a* and 675*b* and GPUs 685*a* and 685*b*) to which a touch application can be offloaded from one or more of the processor cores.

Still referring to FIG. 7, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 7, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 652 and 654, respectively. As shown in FIG. 7, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 7, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, Ultrabook™, tablet computer, netbook, or so forth.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a multi-domain processor implemented in a processor package comprising:
a core domain including at least one core to execute instructions;
a graphics domain including a plurality of graphics engines each having at least one execution unit, the graphics domain to schedule a touch application to perform processing of raw touch data, the touch application offloaded from the core domain to at least one of the plurality of graphics engines, the touch application to execute responsive to an update to a doorbell location in a system memory coupled to the multi-domain processor, the doorbell location written responsive to a user input to a touch input device coupled to the multi-domain processor; and
a memory controller wherein the at least one graphics engine is to exit a low power state while the core domain is in a low power state, responsive to detection by the memory controller of the write to the doorbell location, wherein the touch application is to request the doorbell location and to communicate the doorbell location to the graphics domain.

2. The processor of claim 1, further comprising a controller coupled to the touch input device, the controller including a direct memory access (DMA) engine to receive the raw touch data from the touch input device and store the raw touch data in a first shared data buffer of the system memory.

3. The processor of claim 2, wherein the controller further comprises a doorbell interface to receive an interrupt from the touch application responsive to completion of the touch processing on the raw touch data.

4. The processor of claim 3, wherein the touch application is to store processed touch data in a second shared data buffer of the system memory.

5. The processor of claim 4, wherein the core domain is to access the second shared data buffer to obtain the processed touch data responsive to an interrupt from the controller.

6. The processor of claim 2, wherein the controller and the processor are integrated in the processor package.

7. The processor of claim 2, wherein the touch input device is directly coupled to the controller without a touch controller.

8. The processor of claim 3, wherein the controller further comprises an inter-processor communication logic to communicate a second interrupt to the core domain of the processor to indicate the completion of the touch processing.

9. The processor of claim 1, wherein the at least one graphics engine comprises:
a thread dispatch unit;
a compute cluster coupled to the thread dispatch unit including a plurality of execution units and at least one shared cache; and
a second shared cache coupled to the compute cluster.

10. The processor of claim 1, further comprising a state machine to control a first link interface of the processor coupled to the touch input device and to cause raw touch data received from the touch input device to be sent to a first shared data buffer of the system memory via a direct memory access operation.

11. The processor of claim 1, further comprising a controller coupled to the touch input device, the controller to cause the raw touch data received from the touch input device to be stored in a first storage of the processor and to thereafter cause the raw touch data to be stored in the system memory.

12. A non-transitory machine readable-medium having stored thereon instructions, which if performed by a machine cause the machine to perform a method comprising:
initializing a touch application to execute on a graphics processor of a multicore processor, including setting a first doorbell location, allocating a first shared data buffer of a system memory to store raw touch data, allocating a second shared data buffer to store processed touch data, and communicating the first doorbell location to the graphics processor;
receiving, in a sensor hub of the multicore processor, an indication of availability of the raw touch data in a touch input device coupled to the sensor hub;
storing, via the sensor hub, the raw touch data in the first shared data buffer and writing a presence indicator to the first doorbell location; and
responsive to the presence indicator in the first doorbell location, waking the graphics processor, processing the raw touch data in the graphics processor and storing processed touch data in the second shared data buffer.

13. The non-transitory machine readable-medium of claim 12, wherein the method further comprises indicating completion of the touch processing by writing a presence indicator to a second doorbell location.

14. The non-transitory machine readable-medium of claim 13, wherein the method further comprises communicating an interrupt to an operating system responsive to the presence indicator in the second doorbell location, to enable access by a core of the multicore processor to the processed touch data in the second shared data buffer.

15. A system comprising:
a multicore processor including a core domain having a plurality of cores and a graphics domain having a plurality of graphics processors, the graphics domain to execute a touch application offloaded from the core domain, the touch application to execute to process raw touch data of a user input responsive to the user input to a touch input device, and a memory controller, wherein at least one of the plurality of graphics processors is to exit a low power state responsive to detection by the memory controller of a write to a doorbell location in a system memory and to access the raw touch data in the first shared buffer, wherein the touch application is to request the doorbell location and to communicate the doorbell location to the graphics domain;

a sensor hub coupled to the multicore processor to receive inputs from a plurality of sensors including the touch input device;

the touch input device coupled to the sensor hub to communicate the raw touch data of the user input to the sensor hub; and the system memory coupled to the multicore processor, the system memory including the first shared buffer to store the raw touch data and a second shared buffer to store processed touch data generated by the touch application from the raw touch data.

16. The system of claim 15, wherein the sensor hub comprises a direct memory access (DMA) engine to receive the raw touch data and store the raw touch data in the first shared buffer.

17. The system of claim 16, wherein the sensor hub further comprises an inter-processor communication logic to communicate an interrupt to the core domain to indicate storage of the processed touch data.

18. The system of claim 17, wherein the core domain is to access the second shared buffer to obtain the processed touch data responsive to the interrupt.

19. The system of claim 15, wherein the touch input device is directly coupled to the sensor hub without a touch controller.

20. The system of claim 15, wherein the multicore processor includes the sensor hub.

* * * * *